(12) United States Patent
Ohmori

(10) Patent No.: US 10,854,905 B2
(45) Date of Patent: *Dec. 1, 2020

(54) ELECTROCHEMICAL CELL STACK

(71) Applicant: NGK INSULATORS, LTD., Nagoya (JP)

(72) Inventor: Makoto Ohmori, Nagoya (JP)

(73) Assignee: NGK INSULATORS, LTD.

( * ) Notice: Subject to any disclaimer, the term of this patent is extended or adjusted under 35 U.S.C. 154(b) by 61 days.

This patent is subject to a terminal disclaimer.

(21) Appl. No.: 16/210,408

(22) Filed: Dec. 5, 2018

(65) Prior Publication Data
US 2019/0131647 A1 May 2, 2019

Related U.S. Application Data

(63) Continuation of application No. PCT/JP2017/027096, filed on Jul. 26, 2017.

(30) Foreign Application Priority Data

Jul. 27, 2016 (JP) .................................. 2016-147860

(51) Int. Cl.
*H01M 8/1253* (2016.01)
*H01M 8/02* (2016.01)
(Continued)

(52) U.S. Cl.
CPC .......... *H01M 8/1253* (2013.01); *B32B 18/00* (2013.01); *C04B 35/48* (2013.01); *H01M 8/02* (2013.01);
(Continued)

(58) Field of Classification Search
CPC .... H01M 8/1253; H01M 8/12; H01M 8/1213; H01M 2008/1293; H01M 2300/0077
See application file for complete search history.

(56) References Cited

U.S. PATENT DOCUMENTS 9,947,954 B2 * 4/2018 Ohmori .............. H01M 8/2428
10,020,528 B2 * 7/2018 Ohmori .............. C04B 35/486
(Continued)

FOREIGN PATENT DOCUMENTS

JP 2005-187241 A 7/2005
JP 2008-135272 A 6/2008
(Continued)

OTHER PUBLICATIONS

Japanese International Search Report and Written Opinion for corresponding PCT/JP2017/027096 (9 pgs).
(Continued)

*Primary Examiner* — Stewart A Fraser
(74) *Attorney, Agent, or Firm* — Flynn Thiel, P.C.

(57) ABSTRACT

An electrochemical cell stack according to a first aspect of the present invention includes an electrochemical cell and a manifold supporting a base end of the electrochemical cell. The electrochemical cell includes an electric insulative support substrate and a plurality of power generation units disposed on the support substrate. Additionally, a gas flow path is provided in the support substrate. Each of the plurality of power generation units includes an anode, a cathode, and a solid electrolyte layer disposed between the anode and the cathode. Additionally, the solid electrolyte layer contains a zirconia-based material as a main component thereof. In a distal end side power generation unit, which is farthest from the manifold among the plurality of power generation units, the solid electrolyte layer includes a first area covering within 3 μm from an anode side surface, and a second area provided on the first area. An intensity ratio of tetragonal zirconia to cubic zirconia in a Raman spectrum in the first area is greater than an intensity ratio of tetragonal zirconia to cubic zirconia in the Raman spectrum in the second area.

7 Claims, 6 Drawing Sheets

(51) Int. Cl.
- *H01M 8/12* (2016.01)
- *H01M 8/1213* (2016.01)
- *B32B 18/00* (2006.01)
- *C04B 35/48* (2006.01)
- *H01M 8/124* (2016.01)

(52) U.S. Cl.
CPC ........... *H01M 8/12* (2013.01); *H01M 8/1213* (2013.01); *C04B 2235/762* (2013.01); *C04B 2235/765* (2013.01); *H01M 2008/1293* (2013.01); *H01M 2300/0077* (2013.01); *Y02E 60/525* (2013.01)

(56) References Cited

U.S. PATENT DOCUMENTS

2008/0075984 A1    3/2008  Badding et al.
2017/0062857 A1    3/2017  Ohmori et al.
2019/0131648 A1*   5/2019  Ohmori .................. H01M 8/12

FOREIGN PATENT DOCUMENTS

| JP | 2010-505235 A | 2/2010 |
| JP | 2014-191944 A | 10/2014 |
| JP | 2014-216237 A | 11/2014 |
| JP | 5770400 B1 | 8/2015 |

OTHER PUBLICATIONS

English International Search Report for corresponding PCT/JP2017/027096 (2 pgs).

U.S. Appl. No. 16/210 435, filed Dec. 5, 2018.

English International Written Opinion for corresponding PCT/JP2017/027096 (7 pages).

* cited by examiner

ELECTROCHEMICAL CELL STACK

CROSS-REFERENCE TO RELATED APPLICATIONS

This application is a continuation application of PCT/JP2017/027096, filed Jul. 26, 2017, which claims priority to Japanese Application No. 2016-147860, filed Jul. 27, 2016, the entire contents all of which are incorporated herein by reference.

TECHNICAL FIELD

The present invention relates to an electrochemical cell stack.

BACKGROUND

In the related art, fuel cell stacks that include fuel cells and a manifold supporting base ends of the fuel cells are known as a type of electrochemical cell stack (see, for example, Japanese Unexamined Patent Application Publication No. 2008-135272). Each fuel cell includes a support substrate and a power generation unit disposed on the support substrate. Additionally, a gas flow path is provided in the support substrate. Moreover, each fuel cell includes an anode, a cathode, and a solid electrolyte layer disposed between the anode and the cathode.

When the fuel cell is operating, fuel gas is supplied from within the manifold to the gas flow paths of the fuel cells.

SUMMARY

The above described fuel cell maintains its operation temperature at an appropriate level by discharging an excess fuel gas through an exhaust port to make the gas to react with air for combustion. However, at the beginning of operation of the fuel cell, the excess fuel gas reacts with air to fire, which causes a thermal shock on a solid electrolyte layer of the cell. As a result, the thermal shock can damage on a side of the solid electrolyte layer closer to the exhaust port. This damage to the solid electrolyte layer may occur not only when starting the operation of the fuel cells for the first time, but also when restarting operation after temporarily stopping operation.

In light of the foregoing situation, an object of the present invention is to provide an electrochemical cell stack that is capable of reducing damage to the solid electrolyte layer in a distal end side power generation unit.

An electrochemical cell stack according to a first aspect of the present invention includes an electrochemical cell and a manifold supporting a base end of the electrochemical cell. The electrochemical cell includes an electric insulative support substrate and a plurality of power generation units disposed on the support substrate. Additionally, a gas flow path is provided in the support substrate. Each of the plurality of power generation units includes an anode, a cathode, and a solid electrolyte layer disposed between the anode and the cathode. Additionally, the solid electrolyte layer contains a zirconia-based material as a main component thereof. In a distal end side power generation unit, which is farthest from the manifold among the plurality of power generation units, the solid electrolyte layer includes a first area covering within 3 μm from an anode side surface, and a second area provided on the first area. An intensity ratio of tetragonal zirconia to cubic zirconia in a Raman spectrum in the first area is greater than an intensity ratio of tetragonal zirconia to cubic zirconia in the Raman spectrum in the second area.

An electrochemical cell stack according to a second aspect of the present invention includes an electrochemical cell and a manifold supporting a base end of the electrochemical cell. The electrochemical cell includes an electric conductive support substrate and a power generation unit disposed on the support substrate. Additionally, a gas flow path is provided in the support substrate. The power generation unit includes an anode disposed on a first main surface of the support substrate, a cathode, and a solid electrolyte layer disposed between the anode and the cathode. Additionally, the solid electrolyte layer contains a zirconia-based material as a main component thereof. The solid electrolyte layer includes a base end portion positioned on a side of the distal end located on a distal end side of the electrochemical cell and a separated portion positioned separated from the distal end. The distal end portion includes a first area covering within 3 μm from an anode side surface, and a second area provided on the first area. An intensity ratio of tetragonal zirconia to cubic zirconia in a Raman spectrum in the first area is greater than an intensity ratio of tetragonal zirconia to cubic zirconia in the Raman spectrum in the second area.

According to the present invention, an electrochemical cell stack can be provided that is capable of reducing damage to the solid electrolyte layer.

DETAILED DESCRIPTION OF THE PREFERRED EMBODIMENTS

1. First Embodiment

Fuel Cell Stack 100

Figure 1:
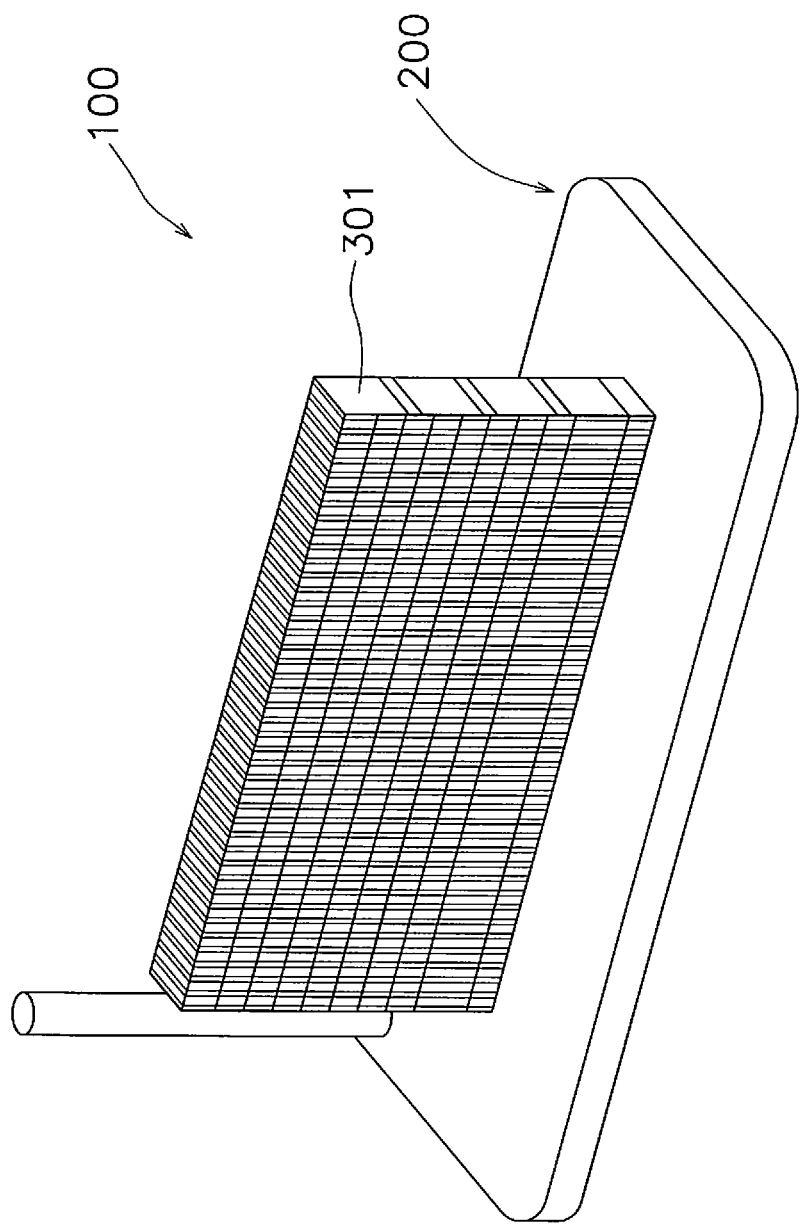
FIG. 1 is a perspective view of a fuel cell stack.
Figure 2:
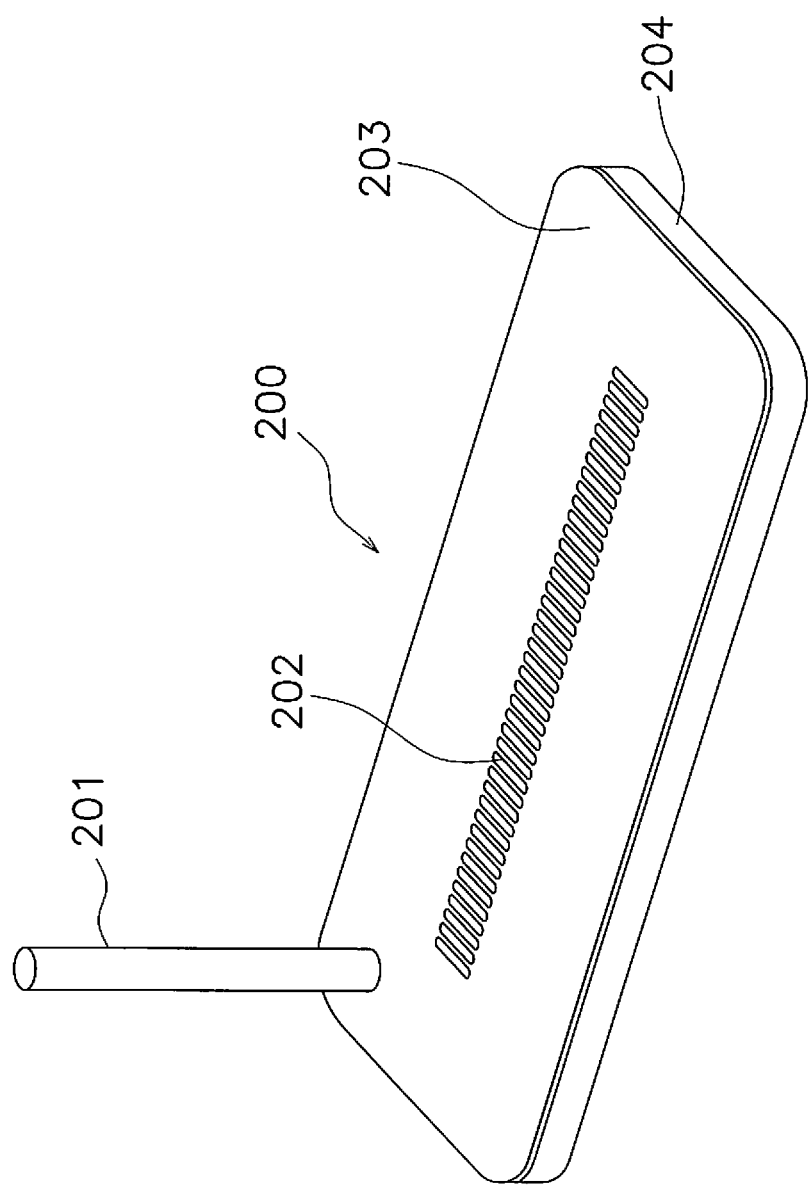
FIG. 2 is a perspective view of a manifold.
Figure 3:
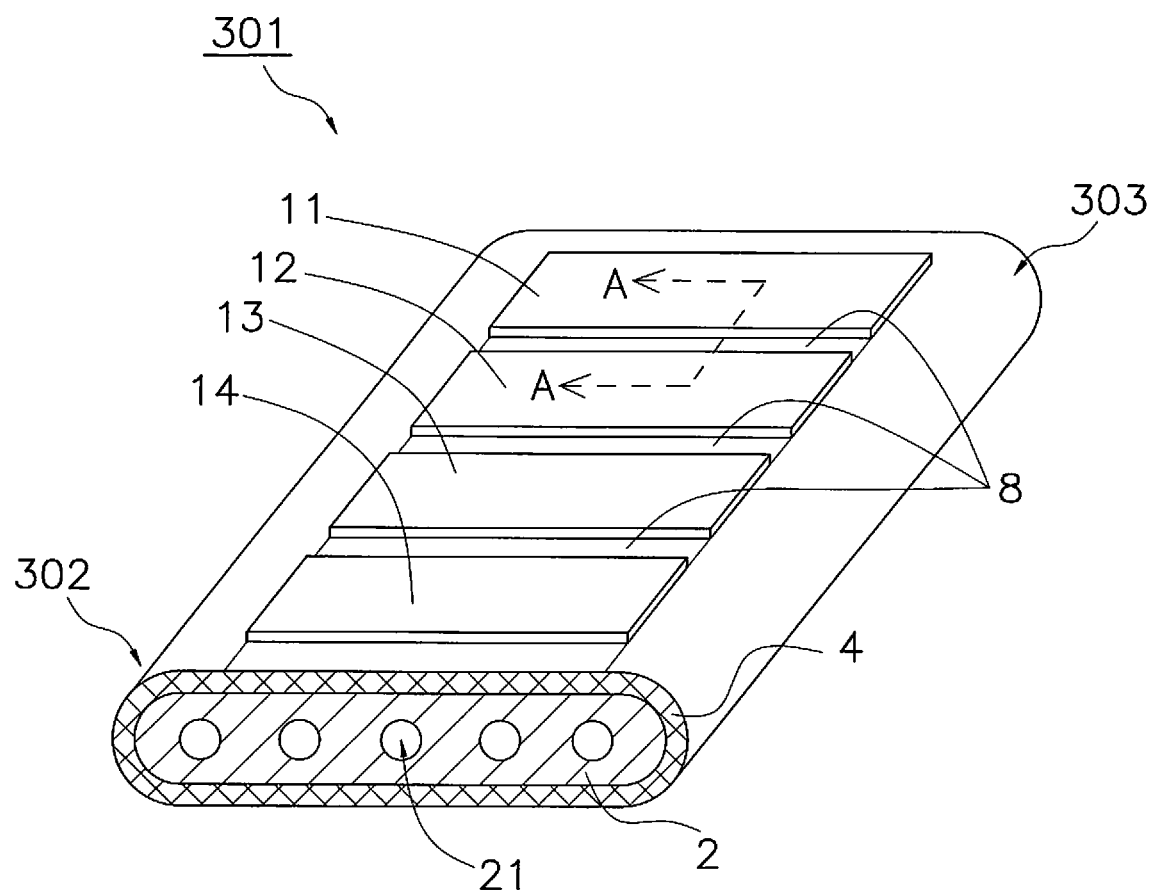
FIG. 3 is a perspective view of a segmented-in-series type fuel cell.
Figure 4:
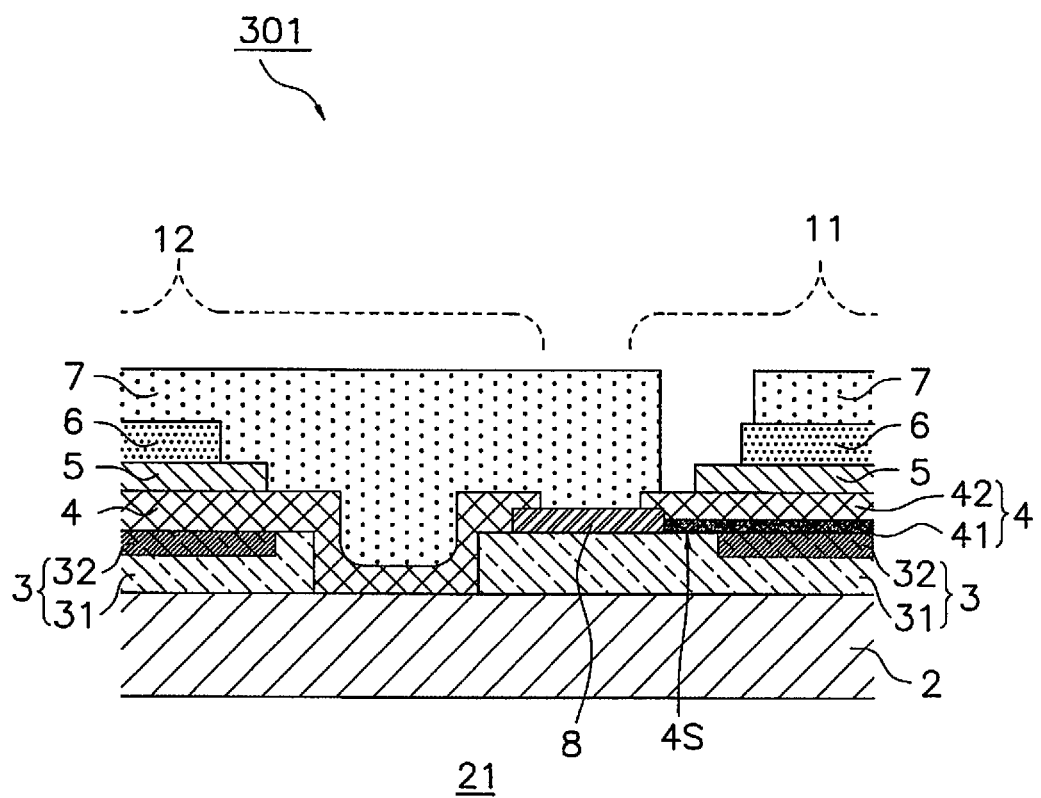
FIG. 4 is a cross-sectional view of FIG. 3, taken along line A-A.

FIG. 1 is a perspective view of a fuel cell stack 100. FIG. 2 is a perspective view of a manifold 200. FIG. 3 is a perspective view of a fuel cell 301. FIG. 4 is a cross-sectional view of FIG. 3, taken along line A-A.

As illustrated in FIG. 1, the fuel cell stack 100 includes the manifold 200 and the plurality of fuel cells 301.

(1) Manifold 200

As illustrated in FIG. 2, the manifold 200 is configured to supply fuel gas to each of the fuel cells 301. The manifold 200 is hollow and has an internal space. The fuel gas is supplied into the internal space of the manifold 200 through an introduction pipe 201. The manifold 200 includes a top plate 203 and a manifold main body 204.

The top plate 203 includes a plurality of through-holes 202. Each of the through-holes 202 is in communication with the internal space and external space of the manifold 200. A base end 302 of each of the fuel cells 301 is inserted into each of the through-holes 202. The top plate 203 is formed from an electric conductive material. The top plate 203 can be formed from a metal material. Stainless steel and similar materials can be used as the metal material, but the material of the top plate 203 is not limited thereto.

The manifold main body 204 is formed in a rectangular parallelepiped shape with the upper side thereof being open. The upper side of the manifold main body 204 is sealed by the top plate 203. The manifold main body 204 may be electric conductive or non-conductive.

(2) Fuel Cells 301

As illustrated in FIGS. 3 and 4, each of the fuel cells 301 is a so-called segmented-in-series type solid oxide fuel cell (SOFC). The base end 302 of each of the fuel cells 301 is inserted into each of the through-holes 202 of the manifold 200. Oxygen-containing gas (air) is supplied around the fuel cells 301.

The base end 302 of each of the fuel cells 301 is fixed to the top plate 203 of the manifold 200 by a bonding material with the base end 302 inserted into each of the through-holes 202. Examples of bonding materials that can be used include crystallized glass, amorphous glass, brazing metal, and ceramics. The distal end 303 of each of the fuel cells 301 is a free end. Thus, each of the fuel cells 301 is supported by the manifold 200 in a cantilevered state.

The fuel cells 301 are connected to each other by current collecting members (not illustrated in the drawings). Examples of materials that can be used for the current collecting members include fired bodies of oxide ceramics, noble metal (Pt, Au, Ag) materials, and base metal (Ni, Ni alloy, composites of Ni and ceramics) materials.

As illustrated in FIGS. 3 and 4, each of the fuel cells 301 includes a support substrate 2 and first to fourth power generation units 11 to 14.

Each of the first to fourth power generation units 11 to 14 includes an anode 3, a solid electrolyte layer 4, a barrier layer 5, a cathode 6, a cathode current collecting layer 7, and an interconnector 8. Note that the cathode current collecting layer 7 is not illustrated in FIG. 3.

The support substrate 2 has a plate-like shape that is flat and long in one direction. The thickness of the support substrate 2 is not particularly limited, but can be set to from 1 mm to 5 mm. The porosity of the support substrate 2 is not particularly limited, but can be set to from 20% to 60%.

The support substrate 2 contains an electric insulative porous material as a main component. Examples of materials that can be used to form the support substrate 2 include MgO (magnesium oxide), mixtures of $MgAl_2O_4$ (magnesia alumina spinel) and MgO (magnesium oxide), and insulating ceramics such as CSZ (calcia stabilized zirconia), 8YSZ (yttria-stabilized zirconia), $Y_2O_3$ (yttria), and CZO (calcium zirconate).

In the present embodiment, "containing as a main component" means containing 70 wt. % or greater of the component.

The support substrate 2 may contain a transition metal or an oxide thereof acting as a catalyst that accelerates the reforming reaction of the fuel gas. Ni (nickel) is preferable as the transition metal.

Five gas flow paths 21 are provided in the support substrate 2. Each of the gas flow paths 21 extends along the longitudinal direction of the support substrate 2. During power generation, the fuel gas flows from a supply port of each of the gas flow paths, which is located at the base end 302 of each of the electrochemical cells, into each of the gas flow paths 21. The fuel gas flowing through the gas flow paths 21 passes through pores in the support substrate 2 to be supplied to the anode 3. The excess fuel gas that flowed through the gas flow paths 21 but was not used in the power generation is discharged from the exhaust port of each of the gas flow paths 21, which is located at the distal end 303 of the fuel cell 301. The excess fuel gas discharged through the exhaust port of each gas flow paths 21 reacts with air (oxygen) for combustion. The heat caused by the combustion heats the fuel cell 301, which maintains the temperature of the fuel cell 301 during normal operation at an appropriate operation temperature. Note that the number of the gas flow paths 21 is not limited to five.

The anode 3 functions as an anode. The anode 3 includes an anode current collecting layer 31 and an anode active layer 32.

The anode current collecting layer 31 is disposed on the support substrate 2. The anode current collecting layer 31 is formed from an electric conductive substance. The anode current collecting layer 31 may contain an oxygen ion conductive substance. For example, the anode current collecting layer 31 can be formed from NiO-8YSZ, NiO—$Y_2O_3$, NiO—CSZ, or the like. The thickness of the anode current collecting layer 31 is not particularly limited, but can be set to from 50 μm to 500 μm. The porosity of the anode current collecting layer 31 is not particularly limited, but can be set to from 25% to 50%.

The anode active layer 32 is disposed on the anode current collecting layer 31. The anode active layer 32 is formed from an electric conductive substance and an oxygen ion conductive substance. For example, the anode active layer 32 can be formed from NiO-8YSZ, NiO-GDC (gadolinium-doped ceria), or the like. It is preferable that the volume ratio of the oxygen ion conductive substance in the anode active layer 32 is greater than the volume ratio of the oxygen ion conductive substance in the anode current collecting layer 31. The thickness of the anode active layer 32 is not particularly limited, but can be set to from 5 μm to 30 μm. The porosity of the anode active layer 32 is not particularly limited, but can be set to from 25% to 50%.

The solid electrolyte layer 4 is disposed between the anode 3 and the cathode 6. The solid electrolyte layer 4 is formed so as to cover the support substrate 2 and the anode 3 and also is connected to the interconnectors 8 of two adjacent power generation units. In the example illustrated in FIG. 4, the solid electrolyte layer 4 of the second power generation unit 12 is connected to the interconnector 8 of the first power generation unit 11. Thus, the solid electrolyte layer 4 and the interconnector 8 are continuous in the surface direction (the direction perpendicular to the thickness direction), forming a sealing film that prevents the fuel gas from mixing with the oxygen-containing gas.

The solid electrolyte layer 4 contains a zirconia-based material as a main component. Examples of materials that can be used as the zirconia-based material include 3YSZ, 8YSZ, and ScSZ (scandia-stabilized zirconia). The configuration of the solid electrolyte layer 4 of the first power generation unit 11 is described later.

The thickness of the solid electrolyte layer 4 is not particularly limited, but can be set to from 3 μm to 50 μm. The solid electrolyte layer 4 is dense. The porosity of the solid electrolyte layer 4 is preferably 20% or less, and more preferably 10% or less.

The barrier layer 5 is disposed on the solid electrolyte layer 4. Examples of materials that can be used to form the barrier layer 5 include ceria and ceria-based materials containing rare-earth metal oxide solid-dissolved in ceria. Examples of such ceria-based materials include GDC, SDC (samarium-doped ceria), and the like. The thickness of the barrier layer 5 is not particularly limited, but can be set to from 3 μm to 50 μm.

The cathode 6 is disposed on the barrier layer 5. Examples of materials that can be used to form the cathode 6 include (La, Sr)(Co, Fe)O$_3$ (LSCF, lanthanum strontium cobalt ferrite), (La, Sr)FeO$_3$ (LSF, lanthanum strontium ferrite), La(Ni, Fe)O$_3$ (LNF, lanthanum nickel ferrite), (La, Sr)CoO$_3$ (LSC, lanthanum strontium cobaltite), and the like. The thickness of the cathode 6 is not particularly limited, but can be set to from 10 μm to 100 μm.

The cathode current collecting layer 7 is formed on the cathode 6. In the example illustrated in FIG. 4, the cathode current collecting layer 7 of the second power generation unit 12 is connected to the interconnector 8 of the first power generation unit 11. The cathode current collecting layer 7 is formed from an electric conductive porous material. Examples of materials that can be used to form the cathode current collecting layer 7 include LSCF, LSC, Ag (silver), Ag—Pd (silver palladium alloy), and the like. The thickness of the cathode current collecting layer 7 is not particularly limited, but can be set to from 50 μm to 500 μm.

The interconnector 8 is disposed on the anode 3. In the example illustrated in FIG. 4, the solid electrolyte layer 4 of the second power generation unit 12 is connected to a first end of the interconnector 8 of the first power generation unit 11, and the solid electrolyte layer 4 of the first power generation unit 11 is connected to a second end of the interconnector 8 of the first power generation unit 11. Additionally, while not illustrated in the drawings, both ends of the interconnector 8 in the longitudinal direction are connected to the solid electrolyte layers 4.

The interconnector 8 is a layer that is denser than the support substrate 2 and the anode 3. The porosity of the interconnector 8 is not particularly limited, but is preferably 20% or less, and more preferably 10% or less. The thickness of the interconnector 8 is not particularly limited, but can be set to from 10 μm to 100 μm.

The interconnector 8 can contain calcium-doped lanthanum chromite (hereinafter referred to as "calcium-doped lanthanum chromite") as a main component. Calcium-doped lanthanum chromite is represented by general formula $La_{1-x}Ca_xCr_{1-y-z}A_yO_3$ (where A is at least one element selected from the group consisting of Ti, V, Mn, Fe, Co, Cu, Ni, Zn, Mg, and Al, $0.025 \leq X \leq 0.3$, $0 \leq Y \leq 0.22$, and $0 \leq Z \leq 0.15$).

Configuration of Solid Electrolyte Layer 4 of First Power Generation Unit 11

Next, the configuration of the solid electrolyte layer 4 of the first power generation unit 11 is described. The first power generation unit 11 is an example of the "distal end side power generation unit", which is farthest from the manifold 200 among the first to fourth power generation units 11 to 14. The first power generation unit 11 is closest to the distal end 303 of the fuel cell 301 among the first to fourth power generation units 11 to 14.

As illustrated in FIG. 4, the solid electrolyte layer 4 of the first power generation unit 11 includes a first area 41 and a second area 42.

The first area 41 contacts the anode 3 at an anode side surface 4S. The first area 41 is an area of the solid electrolyte layer 4 covering within 3 μm from the anode side surface 4S. The anode side surface 4S is the interface between the anode 3 and the solid electrolyte layer 4. The anode side surface 4S is a straight line obtained by approximating a line on which the element concentration contained in the solid electrolyte layer 4 changes dramatically, by the least squares method, when mapping the component concentration in a cross-section of the fuel cell 301.

The first area 41 contains a zirconia-based material as a main component. The first area 41 contains cubic zirconia and tetragonal zirconia as the zirconia-based materials.

Cubic zirconia is a type of zirconia having a mainly cubic crystalline phase. Examples of the cubic zirconia include 8YSZ and 10YSZ (10 mol % yttria stabilized zirconia).

Tetragonal zirconia is a type of zirconia having a mainly tetragonal crystalline phase. Examples of the tetragonal zirconia include zirconia stabilized with 3 mol % or less of yttria such as 2.5YSZ (2.5 mol % yttria stabilized zirconia) and 3YSZ (3 mol % yttria stabilized zirconia).

The second area 42 is an area that is provided on the first area 41 of the solid electrolyte layer 4. The second area 42 is provided on the side of the first area 41 opposite to the anode 3. The thickness of the second area 42 is not particularly limited, but can be set to from 1 μm to 50 μm. From the perspective of reducing damage to the solid electrolyte layer 4, the thickness of the second area 42 is preferably 80% or less of the total thickness of the solid electrolyte layer 4. From the perspective of reducing declines in the oxide ion conductivity of the solid electrolyte layer 4, the thickness of the second area 42 is preferably 20% or greater of the total thickness of the solid electrolyte layer 4.

The second area 42 contains a zirconia-based material as a main component. The second area 42 contains cubic zirconia as the zirconia-based material. The second area 42 may contain tetragonal zirconia.

Here, an intensity ratio R1 of the peak intensity of the tetragonal zirconia to the peak intensity of the cubic zirconia in the Raman spectrum in the first area 41 (hereinafter appropriately abbreviated as "the intensity ratio R1 of the first area 41") is greater than an intensity ratio R2 of the peak intensity of the tetragonal zirconia to the peak intensity of the cubic zirconia in the Raman spectrum in the second area 42 (hereinafter appropriately abbreviated as "the intensity ratio R2 of the second area 42"). Accordingly, damage to the solid electrolyte layer of the first power generation unit 11, which is closest to the exhaust port, due to a thermal shock can be reduced, where the thermal shock is caused at the beginning of operation of the fuel cell 301 when the excess fuel gas discharged from the exhaust port located at the distal end 303 of the fuel cell 301 reacts with air to fire.

The intensity ratio R1 of the first area 41 is acquired as follows.

First, in a cross-section of the first area 41 parallel to the thickness direction, Raman spectra are acquired at five locations equally dividing the first area 41 in the surface direction, which is perpendicular to the thickness direction. The levels in the thickness direction of the five locations where the Raman spectra are acquired are preferably almost the same.

Next, the ratio of the spectral intensity of the tetragonal zirconia to the spectral intensity of the cubic zirconia is calculated by analyzing the Raman spectra of the five locations using the unique Raman spectrum of each of the cubic zirconia and the tetragonal zirconia (known spectral data). The method in which known spectral data is used to analyze the Raman spectra is the CLS method, which is a well-known method for estimating chemical species from Raman spectra.

Next, the intensity ratio R1 of the first area 41 is calculated by taking the arithmetical average of the intensity ratios calculated from the Raman spectra of the five locations. The intensity ratio R1 is an index that indicates the concentration ratio (abundance percentage) of the tetragonal zirconia to the cubic zirconia in the first area 41. The intensity ratio R1 of the first area 41 is expressed as a percentage.

The intensity ratio R1 of the first area 41 is not particularly limited, but can be set to from 0.5% to 10%. The intensity ratio R1 of the first area 41 is preferably 1% or greater, and is more preferably 8% or greater.

The intensity ratio R2 of the second area 42 is acquired as follows in the same manner as the intensity ratio R1 of the first area 41.

First, in a cross-section of the second area 42 parallel to the thickness direction, Raman spectra are acquired at five locations equally dividing the second area 42 in the surface direction. The levels in the thickness direction of the five locations where the Raman spectra are acquired are preferably almost the same.

Next, the ratio of the spectral intensity of the tetragonal zirconia to the spectral intensity of the cubic zirconia is calculated by analyzing the Raman spectra of the five locations using the unique Raman spectrum of each of the cubic zirconia and the tetragonal zirconia (known spectral data).

Next, the intensity ratio R2 of the second area 42 is calculated by taking the arithmetical average of the intensity ratios calculated from the Raman spectra of the five locations. The intensity ratio R2 is an index that indicates the concentration ratio (abundance percentage) of the tetragonal zirconia to the cubic zirconia in the second area 42. The intensity ratio R2 of the second area 42 is expressed as a percentage.

The intensity ratio R2 of the second area 42 is not particularly limited provided that it is less than or equal to the intensity ratio R1 of the first area 41, but can be set to 0.1% or less. The intensity ratio R2 of the second area 42 is more preferably 0.05% or less.

Manufacturing Method of Fuel Cell 301

Next, an example of a manufacturing method of the fuel cell 301 is described.

First, a molded body of the support substrate 2, which has five gas flow paths 21, is formed by extrusion-molding the support substrate material described above.

Next, a molded body of the anode 3 is formed by preparing the anode material described above as a paste and screen printing the paste on the molded body of the support substrate 2.

Next, a molded body of the interconnector 8 is formed by preparing the interconnector material described above as a paste and screen printing the paste on the anode 3.

Next, a molded body of the solid electrolyte layer 4 of the first power generation unit 11 is formed by dip-molding the zirconia material for the first area 41 and, thereafter, dip-molding the zirconia material for the second area 42 in the area on the molded bodies of the support substrate 2 and the anode 3 corresponding to the first power generation unit 11. At this time, the mixture ratio of the tetragonal zirconia contained in the zirconia material for the first area 41 is formulated to be greater than the mixture ratio of the tetragonal zirconia contained in the zirconia material for the second area 42. The intensity ratio R1 of the first area 41 can be adjusted by changing the mixture ratio of the tetragonal zirconia to the cubic zirconia contained in the zirconia material for the first area 41. Likewise, the intensity ratio R2 of the second area 42 can be adjusted by changing the mixture ratio of the tetragonal zirconia to the cubic zirconia contained in the zirconia material for the second area 42. Note that the zirconia material for the second area 42 may only contain cubic zirconia.

Next, molded bodies of the solid electrolyte layers 4 of the second to fourth power generation units 12 to 14 are formed by dip-molding the zirconia material in the areas on the molded bodies of the support substrate 2 and the anode 3 corresponding to the second to fourth power generation units 12 to 14. Note that the zirconia material used for the solid electrolyte layers 4 of the second to fourth power generation units 12 to 14 may contain no tetragonal zirconia. Accordingly, the same zirconia material as used for the second area 42 of the solid electrolyte layer 4 of the first power generation unit 11 can be used for the solid electrolyte layers 4 of the second to fourth power generation units 12 to 14.

Next, a molded body of the barrier layer 5 is formed by dip-molding the barrier layer material on the molded body of the solid electrolyte layer 4.

Next, the molded bodies of the support substrate 2, the anode 3, the solid electrolyte layer 4, the barrier layer 5, and the interconnector 8 are co-fired (at 1300° C. to 1600° C. for 2 to 20 hours).

Next, a molded body of the cathode 6 is formed by preparing the cathode material as a paste and screen printing the paste on the barrier layer 5.

Next, a molded body of the cathode current collecting layer 7 is formed by preparing the cathode current collecting layer material as a paste and screen printing the paste on the molded body of the cathode 6.

Next, the molded bodies of the cathode 6 and the cathode current collecting layer 7 are fired (at 900° C. to 1100° C. for 1 to 20 hours).

2. Second Embodiment

The first embodiment describes that the solid electrolyte layer according to the present invention is applied to a segmented-in-series type fuel cell, but application to a flat-tubular type fuel cell is also possible. An aspect in which the solid electrolyte layer according to the present invention is applied to a flat-tubular type fuel cell is described below. Note that the configuration of the fuel cell differs between the first embodiment and the second embodiment; thus, this point is mainly discussed.

Configuration of Fuel Cell 401

Figure 5:
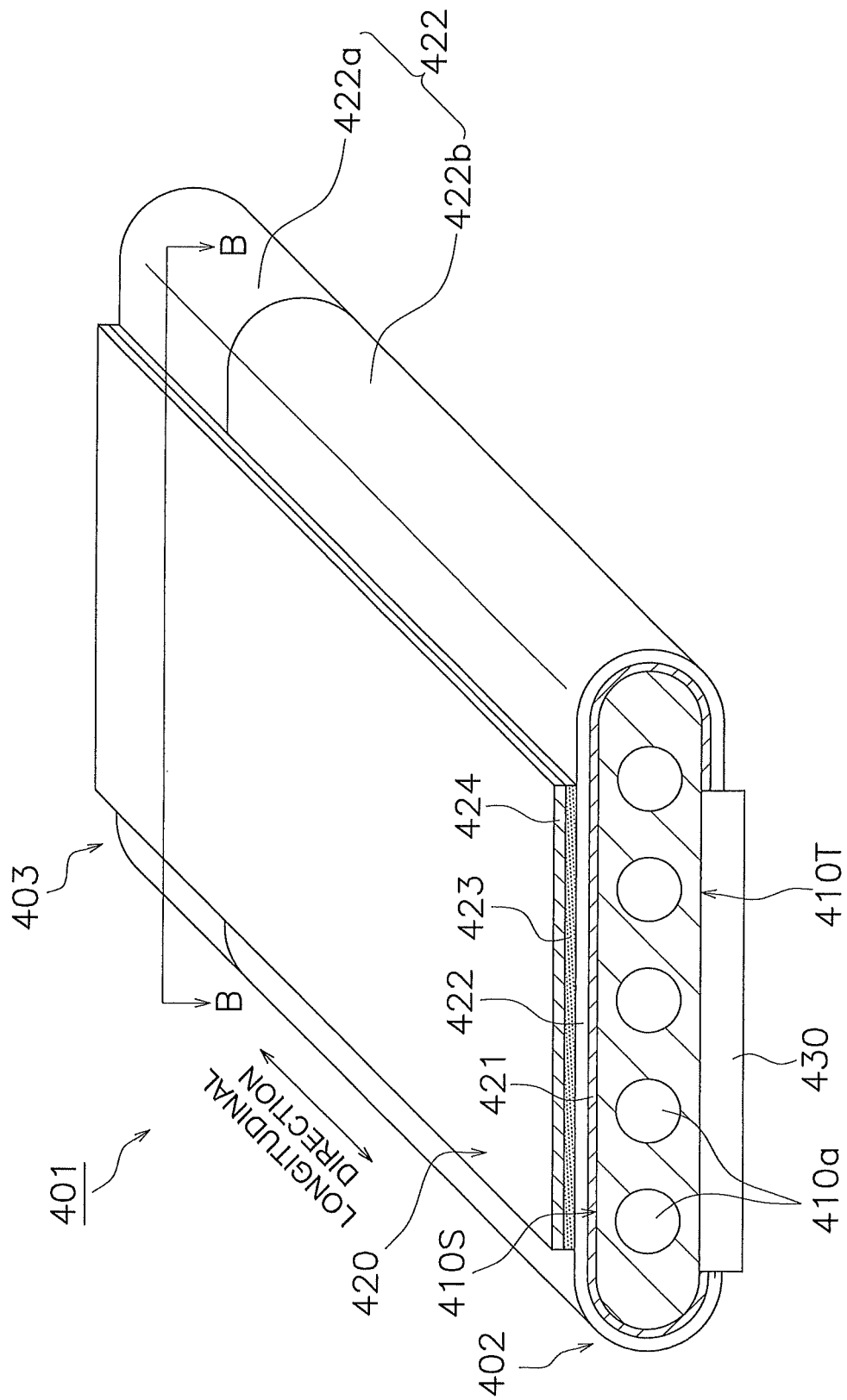
FIG. 5 is a perspective view of a flat-tubular type fuel cell.
Figure 6:
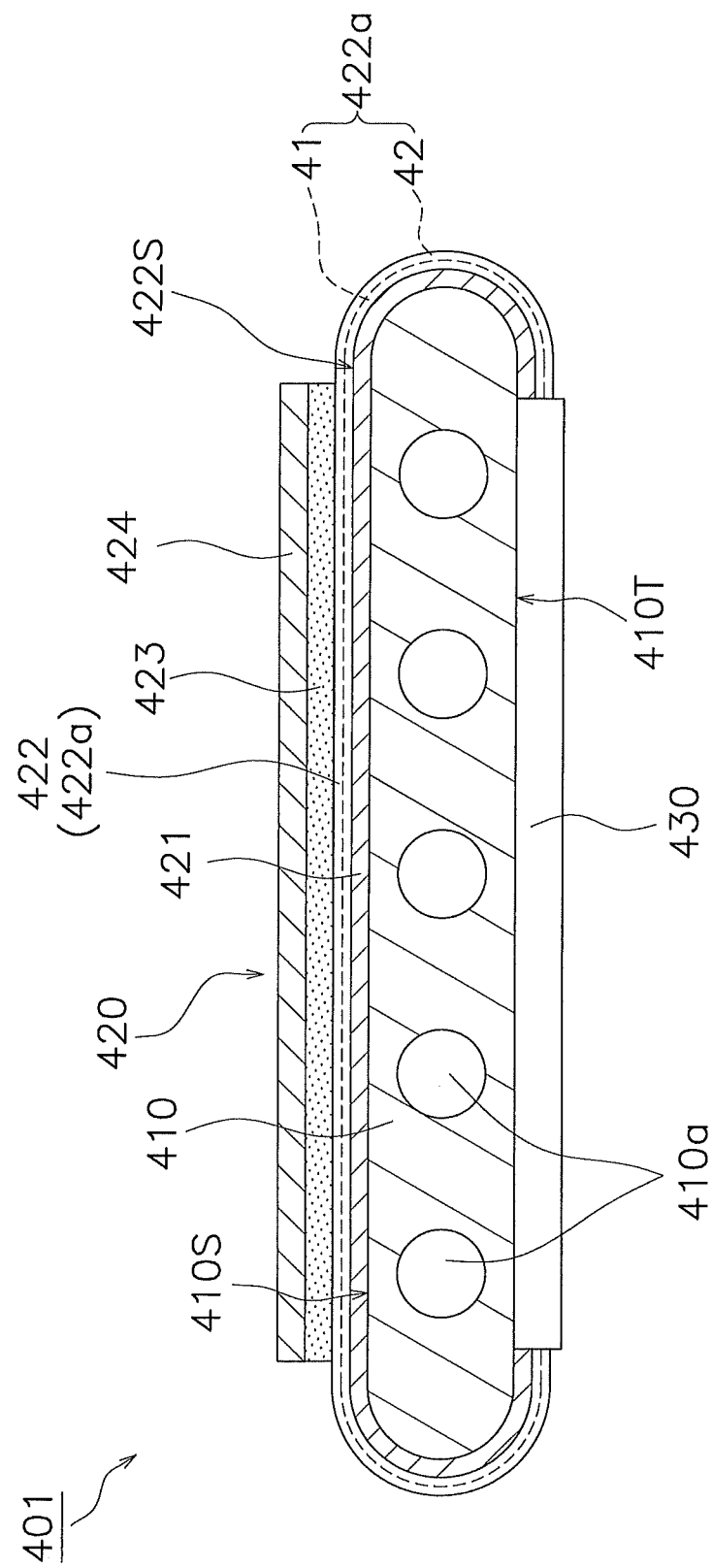
FIG. 6 is a cross-sectional view of FIG. 5, taken along line B-B.

FIG. 5 is a perspective view of a fuel cell 401. FIG. 6 is a cross-sectional view of the fuel cell 401.

The fuel cell 401 is a so-called flat-tubular type solid oxide fuel cell (SOFC). Base ends 402 of the fuel cells 401 are fixed to the through-holes 202 by a bonding material with the base ends 402 inserted into the through-holes 202 of the manifold 200 (see FIG. 2). A distal end of the fuel cell 401 is a free end.

The fuel cell 401 includes a support substrate 410, a power generation unit 420, and an interconnector 430.

(1) Support Substrate 410

The support substrate 410 is formed to have a flat plate-like shape. The support substrate 410 supports the power generation unit 420 and the interconnector 430. The support substrate 410 has a first main surface 410S and a second main surface 410T. The power generation unit 420 is disposed on the first main surface 410S. The interconnector 430 is disposed on the second main surface 410T.

Gas flow paths 410a extending in the longitudinal direction of the fuel cell 401 are provided in the support substrate 410. During power generation, the fuel gas is supplied from the manifold 200 (see FIG. 2) to the gas flow paths 410a. The number of the gas flow paths 410a can be set as desired.

The support substrate 410 is gas-permeable to allow the fuel gas to permeate therethrough to the anode 421, and is electric conductive to collect current via the interconnector 430. The support substrate 410 can be formed from an iron metal component and a ceramic component (for example, a rare earth oxide or the like). Examples of the iron metal component include Fe, Ni, and Co. Examples of the rare earth oxide include $Y_2O_3$ and $Yb_2O_3$.

The thickness of the support substrate 410 is not particularly limited, but can be set to, for example, from 2 mm to 35 mm. The length of the support substrate 410 is not particularly limited, but can be set to, for example, from 50 mm to 250 mm.

(2) Power Generation Unit 420

The power generation unit 420 includes an anode 421, a solid electrolyte layer 422, a barrier layer 423, and a cathode 424.

The anode 421 is disposed on the first main surface 410S of the support substrate 410. The anode 421 can be formed from, for example, $ZrO_2$ or $CeO_2$ in which a rare earth oxide is solid-dissolved and Ni and/or NiO.

It is sufficient that the anode 421 be disposed at a position facing at least the cathode 424. Accordingly, in FIGS. 5 and 6, the anode 421 extends to both ends of the interconnector 430 on the second main surface 410T, but the anode 421 may be disposed only on the first main surface 410S.

The solid electrolyte layer 422 is disposed between the anode 421 and the cathode 424. The solid electrolyte layer 422 has gas barrier properties to prevent the leakage of the fuel gas and the oxygen-containing gas. The relative density of the solid electrolyte layer 422 is preferably 93% or greater, and more preferably 95% or greater.

The solid electrolyte layer 422 contains a zirconia-based material as a main component. Examples of materials that can be used as the zirconia-based material include 3YSZ, 8YSZ, and ScSZ (scandia-stabilized zirconia).

The solid electrolyte layer 422 according to the present embodiment includes a distal end portion 422a and a separated portion 422b.

The distal end portion 422a is integrally formed with the separated portion 422b. The distal end portion 422a is positioned on the distal end 403 side (opposite to the manifold 200) of the fuel cell 401. That is, the distal end portion 422a is an area of the solid electrolyte layer 422 closest to the distal end 403, that is, farthest from the base end 402. Specifically, the distal end portion 422a can be set to an area covering ¼ the total length in the longitudinal direction of the solid electrolyte layer 422. The specific configuration of the base end portion 422a is described later.

The separated portion 422b is the area of the solid electrolyte layer 422 other than the distal end portion 422a. The separated portion 422b is positioned separated from the distal end 403 of the fuel cell 401. That is, the separated portion 422b is an area of the solid electrolyte layer 422 that is separated from the distal end 403. The separated portion 422b can be set to an area covering ¾ the total length in the longitudinal direction of the solid electrolyte layer 422.

The barrier layer 423 is disposed between the solid electrolyte layer 422 and the cathode 424. The barrier layer 423 is provided to block element diffusion from the cathode 424 to the solid electrolyte layer 422. The barrier layer 423 can be formed from, for example, a Ce-containing oxide.

The cathode 424 is disposed at a position facing the anode 421 with the solid electrolyte layer 422 disposed therebetween. The cathode 424 can be formed from a perovskite oxide represented by general formula $ABO_3$. Examples of such a perovskite oxide include transition metal perovskite oxides. Examples of the transition metal perovskite oxides include (La, Sr) (Co, Fe) $O_3$ oxides, $LaMnO_3$ oxides, $LaFeO_3$ oxides, and $LaCoO_3$ oxides.

(3) Interconnector 430

The interconnector 430 is disposed on the second main surface 410T of the support substrate 410. The interconnector 430 can be formed form an electric conductive ceramic that is reduction resistant, oxidation resistant, and dense. Examples of such an electric conductive ceramic include lanthanum chromite-based perovskite oxides ($LaCrO_3$ oxides). The relative density of the interconnector 430 is, for example, preferably 93% or greater, and more preferably 95% or greater. The thickness of the interconnector 430 is not particularly limited, but can be set to, for example, from 10 μm to 200 μm.

Configuration of Distal End Portion 422a of Solid Electrolyte Layer 422

Next, the configuration of the distal end portion 422a of the solid electrolyte layer 422 is described.

As illustrated in FIG. 5, the distal end portion 422a includes a first area 41 and a second area 42.

The first area 41 is an area of the distal end portion 422a covering within 3 μm from an anode side surface 422S. The anode side surface 422S is the interface between the anode 421 and the solid electrolyte layer 422. The anode side surface 422S is a straight line obtained by approximating a line on which the element concentration contained in the solid electrolyte layer 422 changes dramatically, by the least squares method, when mapping the component concentration in a cross-section of the fuel cell 301.

The first area 41 contains a zirconia-based material as a main component. The first area 41 contains cubic zirconia and tetragonal zirconia as the zirconia-based materials.

Cubic zirconia is a type of zirconia having a mainly cubic crystalline phase. Examples of the cubic zirconia include 8YSZ and 10YSZ (10 mol % yttria stabilized zirconia).

Tetragonal zirconia is a type of zirconia having a mainly tetragonal crystalline phase. Examples of the tetragonal zirconia include zirconia stabilized with 3 mol % or less of yttria such as 2.5YSZ (2.5 mol % yttria stabilized zirconia) and 3YSZ (3 mol % yttria stabilized zirconia).

The second area 42 is an area of the solid electrolyte layer 422 that is provided on the first area 41. The second area 42 is provided on the side of the first area 41 opposite to the anode 421. The thickness of the second area 42 is not particularly limited, but can be set to from 1 μm to 50 μm. From the perspective of reducing damage to the solid electrolyte layer 422, the thickness of the second area 42 is preferably 80% or less of the total thickness of the solid electrolyte layer 422. From the perspective of reducing declines in the oxide ion conductivity of the solid electrolyte layer 422, the thickness of the second area 42 is preferably 20% or greater of the total thickness of the solid electrolyte layer 422.

The second area 42 contains a zirconia-based material as a main component. The second area 42 contains cubic zirconia as the zirconia-based material. The second area 42 may contain tetragonal zirconia.

Here, a ratio R1 of the peak intensity of the tetragonal zirconia to the peak intensity of the cubic zirconia in the Raman spectrum in the first area 41 (hereinafter appropriately abbreviated as "the intensity ratio R1 of the first area 41") is greater than a ratio R2 of the peak intensity of the tetragonal zirconia to the peak intensity of the cubic zirconia in the Raman spectrum in the second area 42 (hereinafter appropriately abbreviated as "the intensity ratio R2 of the second area 42"). The cubic zirconia particles are thus strongly linked to each other by the tetragonal zirconia particles, which have a smaller particle size than that of the cubic zirconia particles. As a result, the framework structure of the porous first area 41 can be strengthened. Accordingly, even if the temperature of the base end 402 declines due to an insufficient preheating of the fuel gas on the base end 402 side of the gas flow path 410*a* of the fuel cell 401, damage to the distal end portion 422*a* of the solid electrolyte layer 422 due to thermal stress can be reduced.

The intensity ratio R1 of the first area 41 is acquired as follows.

First, in a cross-section of the first area 41 parallel to the thickness direction, Raman spectra are acquired at five locations equally dividing the first area 41 in the surface direction, which is perpendicular to the thickness direction. The levels in the thickness direction of the five locations where the Raman spectra are acquired are preferably almost the same.

Next, the ratio of the spectral intensity of the tetragonal zirconia to the spectral intensity of the cubic zirconia is calculated by analyzing the Raman spectra of the five locations using the unique Raman spectrum of each of the cubic zirconia and the tetragonal zirconia (known spectral data). The method in which known spectral data is used to analyze the Raman spectra is the CLS method, which is a well-known method for estimating chemical species from Raman spectra.

Next, the intensity ratio R1 of the first area 41 is calculated by taking the arithmetical average of the intensity ratios calculated from the Raman spectra of the five locations. The intensity ratio R1 is an index that indicates the concentration ratio (abundance ratio) of the tetragonal zirconia to the cubic zirconia in the first area 41. The intensity ratio R1 of the first area 41 is expressed as a percentage.

The intensity ratio R1 of the first area 41 is not particularly limited, but can be set to from 0.5% to 10%. The intensity ratio R1 of the first area 41 is preferably 1% or greater, and is more preferably 8% or less.

The intensity ratio R2 of the second area 42 is acquired as follows in the same manner as the intensity ratio R1 of the first area 41.

First, in a cross-section of the second area 42 parallel to the thickness direction, Raman spectra are acquired at five locations equally dividing the second area 42 in the surface direction. The levels in the thickness direction of the five locations where the Raman spectra are acquired are preferably almost the same.

Next, the ratio of the spectral intensity of the tetragonal zirconia to the spectral intensity of the cubic zirconia is calculated by analyzing the Raman spectra of the five locations using the unique Raman spectrum of each of the cubic zirconia and the tetragonal zirconia (known spectral data).

Next, the intensity ratio R2 of the second area 42 is calculated by taking the arithmetical average of the intensity ratios calculated from the Raman spectra of the five locations. The intensity ratio R2 is an index that indicates the concentration ratio (abundance ratio) of the tetragonal zirconia to the cubic zirconia in the second area 42. The intensity ratio R2 of the second area 42 is expressed as a percentage.

The intensity ratio R2 of the second area 42 is not particularly limited provided that it is less than or equal to the intensity ratio R1 of the first area 41, but can be set to 0.1% or less. The intensity ratio R2 of the second area 42 is more preferably 0.05% or less.

Manufacturing Method of Fuel Cell 401

First, a slurry is prepared by mixing a pore former, an organic binder, a solvent, and a dispersant with a mixed power (mixed powder including an iron metal or an oxide powder thereof and a rare earth oxide powder) for forming the support substrate 410. A molded body of the plate-like support substrate 410, in which gas flow paths are provided, is formed by extrusion-molding this slurry.

Next, a slurry is prepared by mixing an organic binder and a solvent with a mixed power (for example, a mixed powder including NiO powder and YSZ powder) for forming the anode 421. Then, a molded body of the anode 421 is formed by wrapping an anode sheet, made from this slurry, over the first main surface 410S of the molded body of the support substrate 410.

Next, a molded body of the distal end portion 422*a* of the solid electrolyte layer 422 is formed by dip-molding the zirconia material for the first area 41 and, thereafter, dip-molding the zirconia material for the second area 42 in an area of the molded body of the anode 421 covering up to ¼ the total length in the longitudinal direction of the molded body from the distal end 403.

At this time, the mixture ratio of the tetragonal zirconia contained in the zirconia material for the first area 41 is formulated to be greater than the mixture ratio of the tetragonal zirconia contained in the zirconia material for the second area 42. The intensity ratio R1 of the first area 41 can be adjusted by changing the mixture ratio of the tetragonal zirconia to the cubic zirconia contained in the zirconia material for the first area 41. Likewise, the intensity ratio R2 of the second area 42 can be adjusted by changing the mixture ratio of the tetragonal zirconia to the cubic zirconia contained in the zirconia material for the second area 42. Note that the zirconia material for the second area 42 may only contain cubic zirconia.

Next, a molded body of the separated portion 422*b* of the solid electrolyte layer 422 is formed by dip-molding the zirconia material in the area covering more than ¼ the total length in the longitudinal direction of the molded body from the distal end 403. Note that the zirconia material used for the separated portion 422*b* may contain no tetragonal zirconia. Accordingly, the same zirconia material as used for the second area 42 of the distal end portion 422*a* can be used for the separated portion 422*b*.

Next, a slurry is prepared by mixing an organic binder and a solvent with a powder (for example, GDC) for forming the barrier layer 423. Then, a molded body of the barrier layer 423 is formed by wrapping a barrier layer sheet, made from this slurry, over the molded body of the solid electrolyte layer 422 (the distal end portion 422*a* and the separated portion 422*b*).

Next, a slurry is prepared by mixing an organic binder and a solvent with a powder (for example, a $LaCrO_3$-based material) for forming the interconnector 430. Then, an interconnector sheet made from this slurry is disposed on the second main surface 410T of the molded body of the support substrate 410.

Next, the resulting laminate is subjected to heat treatment for binder removal and, thereafter, is co-fired in an oxygen-containing atmosphere at 1300° C. to 1600° C. to obtain fired bodies of the support substrate 410, the power generation unit 420 (except the cathode 424), and the interconnector 430.

Next, a molded body of the cathode 424 is formed by dispersing a powder (for example, a $LaFeO_3$-based oxide powder) for forming the cathode 424 in a solvent to prepare a coating solution, and dip-molding this coating solution on the surface of the barrier layer 423.

Next, the cathode 424 is formed by firing the molded body of the cathode 424 at 1000° C. to 1300° C.

OTHER EMBODIMENTS

The present invention is not limited to above embodiments, and various types of variations and modifications may be made without departing from the scope of the invention.

The above embodiments describe that the solid electrolyte layer according to the present invention is applied to a solid oxide fuel cell. However, in addition to solid oxide fuel cells, the solid electrolyte layer according to the present invention can be applied to solid oxide electrochemical cells such as solid oxide electrolytic cells.

The above embodiments describe that the first to fourth power generation units 11 to 14 are disposed on the support substrate 2, but the number of power generation units can be set as desired.

The above embodiments describe the solid electrolyte layer 4 of the "distal end side power generation unit", namely the first power generation unit 11, which is farthest from the manifold 200. However, the solid electrolyte layers 4 of the second to fourth power generation units may have configurations that differ from that of the solid electrolyte layer 4 of the first power generation unit 11. For example, the entire solid electrolyte layer 4 of each of the second to fourth power generation units may have the same configuration as the second area 42 of the solid electrolyte layer 4 of the first power generation unit 11. Additionally, the solid electrolyte layer 4 of each of the second to fourth power generation units may have the same configuration as the solid electrolyte layer 4 of the first power generation unit 11.

What is claimed is:

1. An electrochemical cell stack, comprising:
   an electrochemical cell; and
   a manifold supporting a base end of the electrochemical cell;
   the electrochemical cell including an electric insulative support substrate and a plurality of power generation units disposed on the support substrate, a gas flow path being provided in the support substrate;
   each of the plurality of power generation units including an anode, a cathode, and a solid electrolyte layer disposed between the anode and the cathode, the solid electrolyte layer containing a zirconia-based material as a main component thereof;
   in a distal end side power generation unit, which is farthest from the manifold among the plurality of power generation units, the solid electrolyte layer including a first area covering within 3 μm from an anode side surface, and a second area provided on the first area; and
   an intensity ratio of tetragonal zirconia to cubic zirconia in a Raman spectrum in the first area being greater than an intensity ratio of tetragonal zirconia to cubic zirconia in the Raman spectrum in the second area.

2. The electrochemical cell stack according to claim 1, wherein
   the intensity ratio of the tetragonal zirconia to the cubic zirconia in the Raman spectrum in the first area is 1% or greater.

3. The electrochemical cell stack according to claim 1, wherein
   the intensity ratio of the tetragonal zirconia to the cubic zirconia in the Raman spectrum in the second area is 0.1% or less.

4. An electrochemical cell stack, comprising:
   an electrochemical cell; and
   a manifold supporting a base end of the electrochemical cell;
   the electrochemical cell including an electric conductive support substrate and a power generation unit disposed on the support substrate, a gas flow path being provided in the support substrate;
   the power generation unit including an anode disposed on a first main surface of the support substrate, a cathode, and a solid electrolyte layer disposed between the anode and the cathode, the solid electrolyte layer containing a zirconia-based material as a main component thereof;
   the solid electrolyte layer including a distal end portion positioned on a side of the distal end of the electrochemical cell and a separated portion positioned separated from the distal end;
   the distal end portion including a first area covering within 3 μm from an anode side surface, and a second area provided on the first area; and
   an intensity ratio of tetragonal zirconia to cubic zirconia in a Raman spectrum in the first area being greater than an intensity ratio of tetragonal zirconia to cubic zirconia in the Raman spectrum in the second area.

5. The electrochemical cell stack according to claim 4, wherein
   the distal end portion is an area covering ¼ a total length of the solid electrolyte layer in a direction in which the gas flow path extends.

6. The electrochemical cell stack according to claim 4, wherein
   the intensity ratio of the tetragonal zirconia to the cubic zirconia in the Raman spectrum in the first area is 1% or greater.

7. The electrochemical cell stack according to claim 4, wherein
   the intensity ratio of the tetragonal zirconia to the cubic zirconia in the Raman spectrum in the second area is 0.1% or less.

* * * * *